March 31, 1942. J. H. ROETHEL 2,277,779
VENTILATING WINDOW
Filed June 15, 1938 2 Sheets-Sheet 1
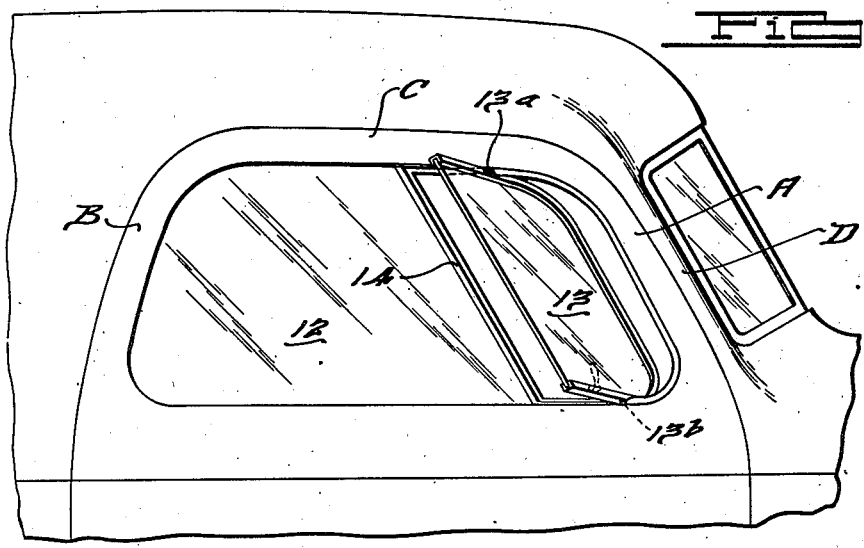
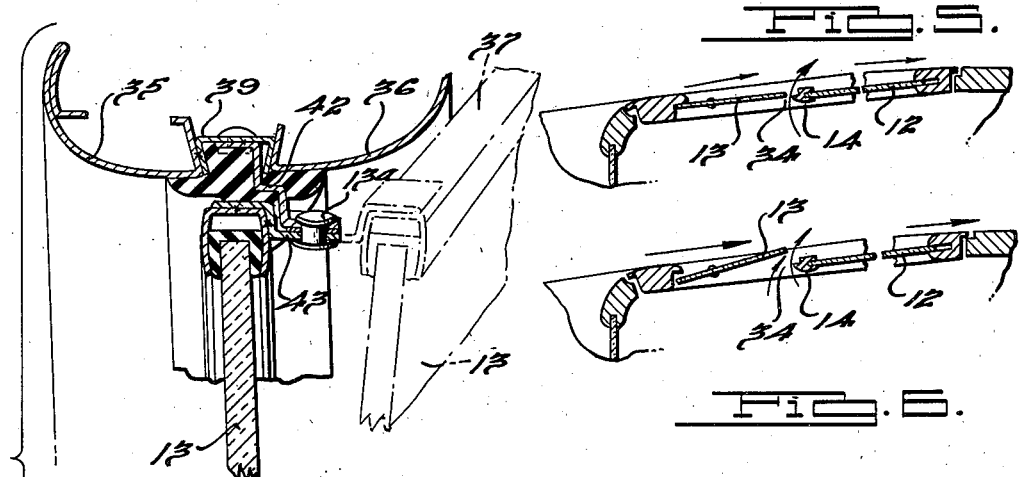
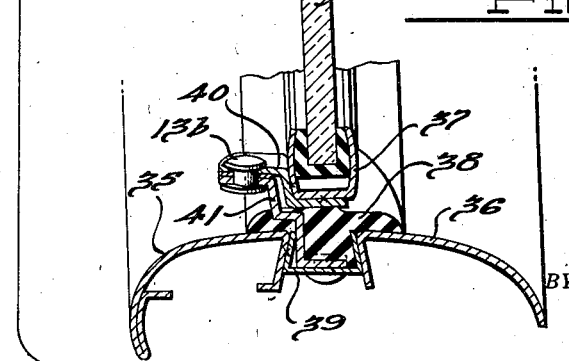
INVENTOR
John H. Roethel
BY Dike, Calver & Gray
ATTORNEYS.

March 31, 1942.  J. H. ROETHEL  2,277,779
VENTILATING WINDOW
Filed June 15, 1938  2 Sheets-Sheet 2
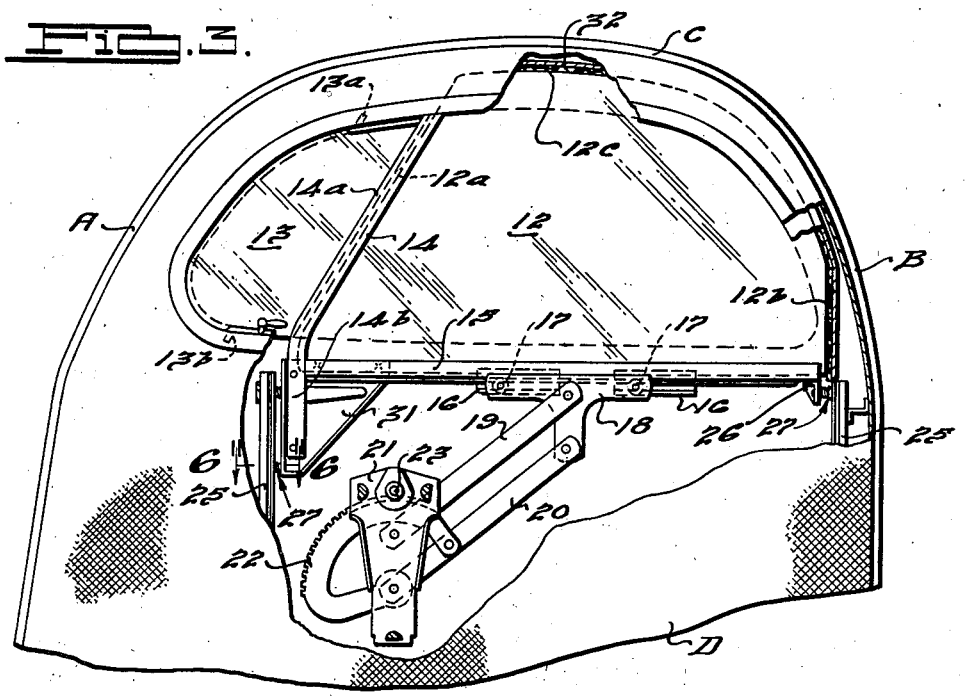
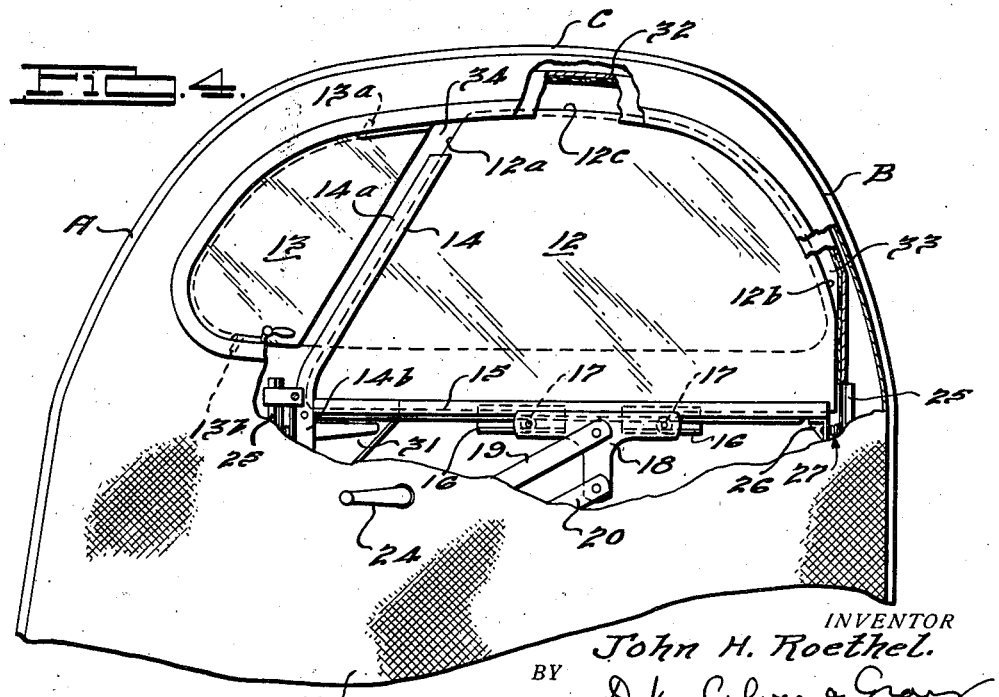
INVENTOR
John H. Roethel.
BY Dike, Calvert & Gray
ATTORNEYS.

Patented Mar. 31, 1942

2,277,779

UNITED STATES PATENT OFFICE 2,277,779

VENTILATING WINDOW

John H. Roethel, Detroit, Mich., assignor to Marvel Equipment Corporation, Detroit, Mich., a corporation of Michigan Application June 15, 1938, Serial No. 213,871

6 Claims. (Cl. 296—44)

This invention relates to ventilating windows for motor vehicles, particularly automobiles, and is especially useful in connection with window structures of the front doors of automobile bodies wherein it is desired to control the window opening by means of a pivoted transparent panel and a vertically slidable transparent panel cooperable therewith in fully raised position to close the window opening.

An object of the invention is to provide a ventilating window structure of the foregoing type in which the pivoted transparent or wing type panel is mounted in improved manner so as to induce improved and more favorable ventilating effects when the wing is operated.

A further object is to provide a ventilating window structure of the foregoing character in which the wing type panel may be substantially or approximately balanced and in which the pivotal axis is inclined in two directions so as to intersect the panel, thereby imparting a desirable angular movement to the panel when adjusted.

Still another object of the invention is to provide a ventilating window structure embodying a pivoted transparent panel and a vertically slidable transparent panel cooperable to close the window opening and in which the sliding panel may be adjusted to provide a ventilating slot between the adjacent edges of the panels while leaving the remainder of the window opening closed or substantially so.

Other objects of this invention will appear in the following description and appended claims, reference being had to the accompanying drawings forming a part of this specification wherein like reference characters designate corresponding parts in the several views.

Fig. 1 is a fragmentary outer side view of a front upper portion of an automobile body illustrating a front door embodying a window structure in accordance with the present invention.

Fig. 2 is an enlarged sectional view taken at an angle through the upper and lower pivots of the pivoted ventilating wing or swinging glass panel.

Fig. 3 is an inner fragmentary side elevation, partly broken away and partly in section, illustrating an automobile door constructed in accordance with one embodiment of the invention.

Fig. 4 is a view similar to Fig. 3 but illustrating the sliding window in partially lowered position to provide a ventilating slot at the forward edge thereof.

Fig. 5 is a diagrammatic horizontal sectional view taken substantially through the swinging and sliding glass panels of Fig. 4.

Fig. 6 is a view similar to Fig. 5 but illustrating the wing swung into a ventilating position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain embodiments of the invention applied, by way of example, to an automobile door, such as the front door thereof. As illustrated the door includes a front sloping pillar A, a rear upright sloping pillar B and an upper header C. The upper portion of the door is provided with a main window opening adapted to be closed by means of a vertically slidable glass or other transparent panel 12 and a horizontally swinging glass or other transparent panel 13. In the present instance the panel 13, which is of the so-called wing type, is disposed at the forward part of the window opening and the sliding panel 12 is disposed in rear thereof, and these panels are preferably arranged so that when in fully closed positions they extend in the same or substantially parallel planes and cooperate together to close the main window opening. The wing type panel 13 may be pivoted at angularly related points 13a and 13b to swing laterally about an up and down axis in the manner hereinafter more fully described. In the present embodiment, by way of example, the forward upright edge 12a of the panel 12 is inclined downwardly and forwardly at an angle preferably substantially corresponding to the angle of inclination of the front pillar A of the door or the front inclined post D of the body. The rear upright edge of the wing 13 is correspondingly sloped or inclined. Secured to the edge 12a of the sliding panel 12 is a channel bar 14 which at its inner side has a forwardly projecting lip or overlap flange 14a against which the rear edge of the wing seats when the window is fully closed.

Secured to the lower edge of the glass panel 12 is a channel bar or glass retainer member 15 which carries channel-like depending horizontal guide members 16 adapted to receive the studs or rollers 17 carried by the window regulator. The window regulator may be of any suitable type and in the present instance a parallel arm type window regulator of well known construction is illustrated simply by way of example. Such a regulator may comprise an outer T-bar 18 carrying the studs 17 and a pair of parallel swinging arms 19 and 20 pivoted at their outer ends to the T-bar. The inner ends of the arms are pivoted at correspondingly vertically spaced points to a mounting plate 21 secured to the inner door panel. The lower arm 20 is fastened to a gear 22 meshing with a pinion on a handle shaft 23 adapted to be rotated manually by a handle 24. Any other suitable type of window regulator may be employed, such for example as a window regulator in accordance with my copending applications Ser. No. 203,068 and Ser. No. 203,069.

The sliding glass 12 is supported and guided within the window well through the medium of upright guides and compression devices cooperating therewith. In the present instance this panel is yieldingly suspended within the well at three spaced points. As illustrated in Fig. 3 the bar 14 has a depending substantially vertical extension 14b within the window well. A pair of channel guides 25 are mounted in fixed position adjacent and beyond the front and rear ends of the retainer member 15 through the medium of suitable brackets within the well. At the rear end of the retainer member 15 and at the underside thereof is secured an angle bracket 26 carrying a yieldable compression device 27 which slidingly cooperates with the inner parallel edges of the rear channel guide 25. To the forward end of the retainer bar 15 is secured an angle bracket 31 which extends a substantial distance below the retainer bar and provides a mounting for the extension 14b which is secured thereto. The bracket 31 in the present instance carries a pair of vertically spaced yieldable compression devices 27 which slidingly cooperate with the front channel bar 25. Thus, the glass panel 12 is supported at three points upon the channel guides 25 by the spring compression devices 27. The channel guides 25 and compression devices 27 together with the supporting brackets therefor may be constructed substantially in accordance with my above mentioned applications and my copending application Ser. No. 175,780. The relation thereof to the sliding glass panel and the manner in which they operate may also be substantially in accordance with my said copending applications.

In the embodiment of the present invention illustrated in Figs. 3 to 6 inclusive the header C of the window frame may be provided with a relatively deep header channel 32 into which the upper edge 12c of the glass is shiftable when in fully raised position, as seen in Fig. 3. When the glass is in this position the bar 14 will also be moved into position to permit the rear edge of the wing 13 to engage the overlap flange 14a and effect a complete closure of the window opening. It will be seen, however, that by reason of the inclination of the forward edge 12a of the sliding glass the latter may be partially lowered to the position shown in Fig. 4 in which the upper edge 12c still remains confined within the header channel 32 and the rear edge 12b is also confined or enclosed by the rear glass runway or channel 33. As the glass is lowered from the position of Fig. 3 to the position of Fig. 4 the edge 12a will drop away from the rear edge of the wing 13, thus providing a ventilating slot 34 between the adjacent inclined edges of the glass panels. At this time, as shown in Figs. 4 and 5, the window opening will be entirely closed except for the ventilating slot 34. Hence, with the wing 13 in closed position and the sliding glass 12 in the position of Fig. 4 a low pressure zone will be created exteriorly of the ventilating slot 34 during the forward travel of the vehicle and a certain amount of air will be withdrawn from the interior of the vehicle body through the ventilating slot through suction as indicated by the arrows in Fig. 5. Withdrawal or extraction of air through the slot 34 may be amplified by slightly swinging the rear edge of the wing 13 outwardly as indicated in Fig. 6. Thus, a considerable withdrawal of air through the ventilating slot may be produced without, however, moving the forward edge of the wing 13 inwardly a sufficient distance to permit air to be blown through the opening created between the forward edge of the wing and the front edge of the window opening. Thus, it will be seen from the foregoing that the car may be ventilated under all weather conditions without creating any substantial drafts and with very slight danger of rain entering through the window in inclement weather.

In the embodiment illustrated in Fig. 1 the rear vertically slidable glass panel 12 may be arranged so that its upper edge will enter either a deep channel as at 32 in the embodiment of Figs. 3 and 4 so as to permit ventilation as above described or the upper header C may be provided simply with a conventional shallow channel to receive the upper edge of the glass panel 12.

In the present embodiments the wing type panel 13 is pivotally mounted in improved manner so as to provide a substantially balanced condition and so as to swing laterally in improved manner to produce improved ventilating effects. As previously stated, the forward edge 12a of the glass 12, which carries the bar 14, is inclined preferably generally in accordance with the inclination of the pillar A and post D. The forward edge of the swinging panel 13 also has substantially a corresponding inclination. In addition, in accordance with the present invention the wing 13 is pivoted at 13a and 13b to swing about an up and down axis which extends on an incline substantially or approximately corresponding to the inclination of the bar 14. Moreover, by preferably balancing the wing so that its pivotal axis substantially or approximately bisects the area of the wing it is possible to swing equivalent portions of the wing inwardly and outwardly without either producing an undesirable obstruction in front of the passenger or projecting the rear edge of the wing forwardly of the pillar A when the wing is swung into the so-called scoop position with the rear edge projected forwardly and the front edge projected rearwardly. Moreover, when the wing assumes this position the rear edge of the wing will assume generally the inclination of the front pillar. In such position the lateral flow of air deflected by the windshield, particularly in the case of V-shaped windshields, will strike the wing more uniformly which will deflect a greater portion of the air downwardly into the vehicle away from the face of the front seat occupant.

As illustrated in Fig. 2 the window reveal around the inner marginal edge of the window opening is formed by means of a metal garnish holding 35 which extends continuously around the inner edge of the window opening. The outer reveal of the window opening is formed by means of the rounded inturned edge 36 of the outer door panel. The wing panel 13 is mounted within a U-shaped channel binding strip or metallic frame 37 which is insulated through the medium of suitable rubber weather-stripping 38 and is carried by a channel shaped frame 39 which may be spot welded to the garnish molding 35. A bracket 40 is spot welded to the bottom and inner side of the channel 37 and a bracket 41 is secured as by spot welding to the channel section 39. The brackets 40 and 41 extend inwardly from the plane of the glass 13 and have overlapping flange portions, insulated one from the other, which carry the lower pivot stud or rivet 13b. At the top of the wing 13 a bracket 42 is spot welded to the channel section 39 and a second bracket 43 is spot welded to the channel frame 37. These brackets have outwardly extending overlapping flanges, insulated one from the other, and carrying the upper pivot stud or rivet 13a. It will be seen that the lower pivot 13b is not only offset inwardly from the plane of the glass but is spaced above the garnish molding 35. In reverse manner the upper pivot 13a is offset outwardly from the plane of the glass and is spaced a suitable distance below the reveal member 36. The pivots 13a and 13b extend at an angle transversely with respect to the plane of the glass and also in axial alinement. Thus, the axis through the pivots about which the wing swings is inclined in two directions, i. e., in a downwardly and forwardly inclined direction generally corresponding to the inclination of the bar 14 and also in an outwardly and inwardly inclined direction. Hence, this axis extends from the pivot 13a downwardly and inwardly to the pivot 13b intersecting the plane of the glass at an intermediate point. This construction has a number of advantages. It enables a ventilating opening in advance of the pivotal axis of increased and uniform width to be produced. It permits the inclined pivoted wing to be swung to clear the garnish molding 35 and the upper reveal flange 36 of the outer body panel, and it also causes the wing to be swung outwardly and upwardly so as to conform more to the contour of the windshield, producing an even, uniform draft of air into or out of the vehicle and a direction of flow into the vehicle away from the face of the passenger.

I claim:

1. In a window structure for a vehicle body having a window opening and a substantially vertically slidable transparent panel adapted to close a portion of said opening and having an inclined edge intermediate the front and rear upright edges of said opening, a wing type panel adapted to close the remaining portion of said window opening and having its upright edge adjacent said slidable panel extending substantially parallel to said edge of the slidable panel, and upper and lower pivots supporting said wing type panel for lateral swinging movement about an inclined axis approximately bisecting said wing type panel and extending approximately in accordance with the inclination of the parallel edges of said panels, said upper pivot being offset outwardly and said lower pivot being offset inwardly from the plane of said wing type panel.

2. In a window structure for a vehicle body front door having a window opening and a substantially vertically slidable transparent panel adapted to close the rear portion of said opening, said panel having a downwardly and forwardly inclined front upright edge, a wing panel adapted to close the remaining forward portion of said window opening and having its rear edge extending substantially parallel to said inclined edge of the slidable panel, and upper and lower pivots supporting said wing panel for lateral swinging movement with the front edge movable inwardly and the rear edge movable outwardly through an arc exceeding ninety degrees, said pivots being inclined to provide a downwardly and forwardly inclined axis intersecting the wing panel above the lower edge thereof.

3. In a window structure for a vehicle body front door having a window opening and a substantially vertically slidable transparent panel adapted to close the rear portion of said opening, said panel having a downwardly and forwardly inclined front upright edge, a wing panel adapted to close the remaining forward portion of said window opening and having its rear edge extending substantially or approximately parallel to said inclined edge of the slidable panel, and upper and lower pivots supporting said wing panel for lateral swinging movement with the front edge movable inwardly and the rear edge movable outwardly, said pivots being inclined to provide a pivotal axis intermediate the front and rear edges of the wing panel which axis intersects the plane of the wing panel above its lower edge, said window structure having a header formed with a relatively deep channel effective to confine the upper edge of the slidable panel when the latter is lowered a substantial distance to provide a ventilating slot between said edges of the panels.

4. In a window structure for an automobile body front door having a window opening and a substantially vertically slidable transparent panel adapted to close the rear portion of said opening, a wing panel adapted to close the remaining forward portion of said window opening, said wing panel having a downwardly and forwardly inclined front upright edge and having its rear upright edge extending substantially parallel to the adjacent edge of the slidable panel, and upper and lower pivots supporting said wing panel for lateral swinging movement with the front edge movable inwardly and the rear edge movable outwardly, the upper pivot being spaced outwardly and the lower pivot spaced laterally and inwardly of the wing panel, and said pivots being inclined to provide a downwardly and inwardly inclined axis intersecting the wing panel above the lower edge thereof.

5. In a window structure for an automobile body front door having a window opening and a substantially vertically slidable transparent panel adapted to close the rear portion of said opening, a wing panel adapted to close the remaining forward portion of said window opening, said wing panel having a downwardly and forwardly inclined front upright edge and having its rear upright edge extending substantially parallel to the adjacent edge of the slidable panel, and upper and lower pivots supporting said wing panel for lateral swinging movement with the front edge movable inwardly and the rear edge movable outwardly, the upper pivot being spaced outwardly and the lower pivot spaced laterally and inwardly of the wing panel, and said pivots being inclined to provide a downwardly and inwardly and also forwardly inclined axis intersecting the wing panel above the lower edge thereof.

6. In a window structure for an automobile body front door having a window opening and a substantially vertically slidable transparent panel adapted to close the rear portion of said opening, a wing panel adapted to close the remaining forward portion of said window opening, said wing panel having a downwardly and forwardly inclined front upright edge and having its rear upright edge extending substantially parallel to the adjacent edge of the slidable panel, and upper and lower pivots supporting said wing panel for lateral swinging movement with the front edge movable inwardly and the rear edge movable outwardly, said pivots being inclined to provide a downwardly and inwardly and also forwardly inclined axis intersecting the wing panel above the lower edge thereof.

JOHN H. ROETHEL.